(No Model.) 2 Sheets—Sheet 1.
A. M. ALLEN.
VELOCIPEDE.
No. 294,178. Patented Feb. 26, 1884.
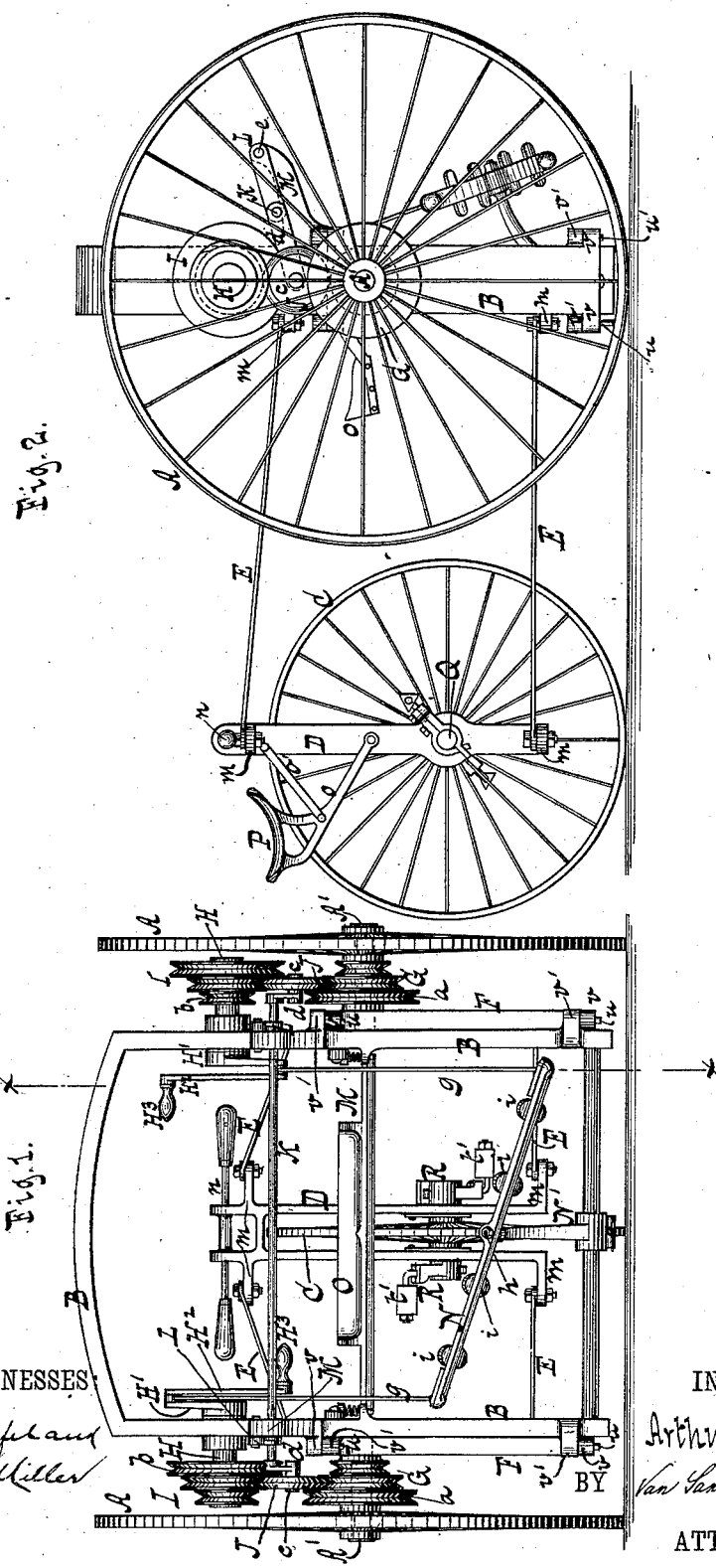
WITNESSES
INVENTOR
Arthur M. Allen
BY Van Santvoord & Hauff
ATTORNEYS (No Model.)  
2 Sheets—Sheet 2.
A. M. ALLEN.
VELOCIPEDE.
No. 294,178.  Patented Feb. 26, 1884.
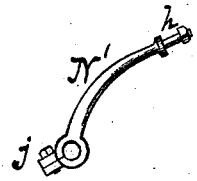
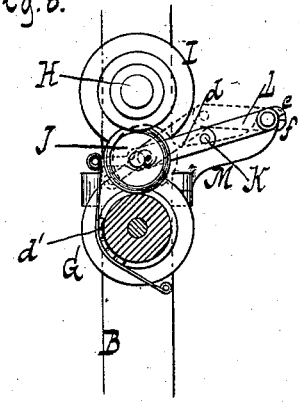
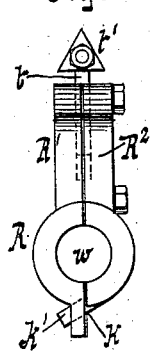
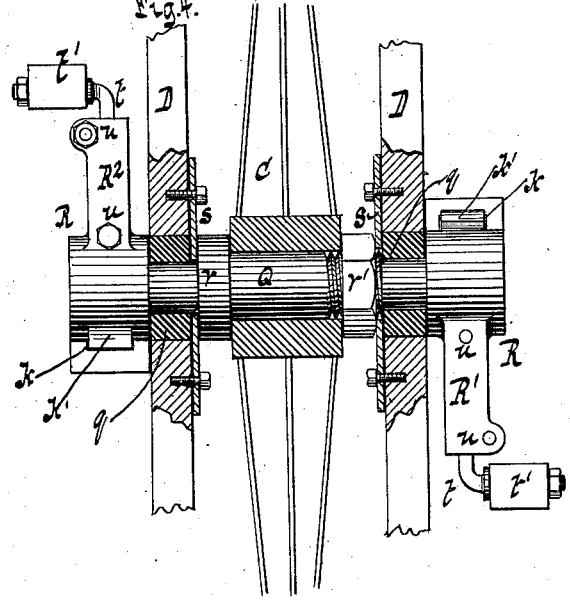
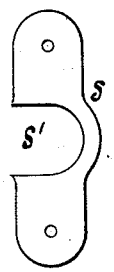
WITNESSES:  
Otto Hufeland  
William Miller  
INVENTOR  
Arthur M. Allen  
BY Van Santvoord & Hauff  
ATTORNEYS

UNITED STATES PATENT OFFICE.

ARTHUR M. ALLEN, OF NEW YORK, N. Y., ASSIGNOR, BY MESNE ASSIGN-MENTS, TO LEONORA L. ALLEN, OF SAME PLACE.

VELOCIPEDE.

SPECIFICATION forming part of Letters Patent No. 294,178, dated February 26, 1884.

Application filed April 12, 1883. (No model.)

*To all whom it may concern:*

Be it known that I, ARTHUR M. ALLEN, a citizen of the United States, residing at New York, in the county and State of New York, have invented new and useful Improvements in Velocipedes and other Vehicles, of which the following is a specification.

This invention relates to the means for changing the speed and power in propelling mechanism for velocipedes and other vehicles while the vehicles are in motion; also, to the general construction of such vehicles, and to the construction and arrangement of one of the vehicle-wheels having a cranked axle, the whole being hereinafter set forth in detail and being illustrated in the accompanying drawings, in which—

Figure 1 represents an end view looking from a forward direction. Fig. 2 is a side elevation. Fig. 3 is a vertical section on the line $x\,x$, Fig. 1. Fig. 4 is a sectional view of the rear or steering wheel and its concomitants.

The remaining figures are detail views of parts.

Similar letters indicate corresponding parts.

The letter A designates a pair of road-wheels supporting a frame, B, and C a single wheel supporting a frame, D, such frames being connected together by rods E on opposite sides of the vehicle, and the whole being so arranged that A are forward wheels and C a rear wheel, which, with the rods E, may be separated from the wheels A and the latter used alone, when desired.

The letter F indicates two pendants, through the medium of which the frame B is connected to the axles of the pair of wheels—that is to say, these pendants are hung to short fixed shafts A', forming the wheel-axles, and are provided on their vertical edges, at or near the top and bottom, with lateral knuckles $v$, to which are connected by vertical pivots $u\,u'$ corresponding knuckles, $v'$, on the frame. The pivots $u\,u'$ are left free at the lower ends to allow an upward movement of the frame B on the pendants F, and the coincident pivots $u$, which are on one edge of the pendants, are made longer than the coincident pivots $u'$, which are on the opposite edge thereof, so that if the frame is lifted a certain distance the pendants are released by or from the short pivots, but remain connected to the frame by the long pivots. Said pendants may then be swung round on the long pivots to bring the pair of road-wheels parallel with the frame B, whereby the vehicle is brought into a small compass for convenience of transportation or storage. The upward movement of the frame B is limited by means of removable pins fixed to the pendants F and working in slots of the frame, as shown in Fig. 3, and to permit such movement the frame can also be connected to the pendants by vertical tenons and grooves, which may be dovetailed. Each of the road-wheels A is provided on the inner side with a central cone, G, forming part of its hub, and in the sides of the frame B are mounted loosely crank-shafts H, each carrying a cone, I, which is opposite to the proper wheel-cone, and which gears therewith through an intermediate wheel, J, so that when a revolving motion is imparted to the crank-shafts such motion is thence transmitted to the wheels. The cones I, which may be termed the "driving-cones," are above the wheel-cones G, and in this case vertically so; but they may vary slightly from that plane without materially affecting the result. Both wheel-cones G and both driving-cones I correspond in position to each other, one set, however, tapering in an opposite direction to the other, and the wheel-cones are each provided with a series of circumferential grooves, $a$, while the driving-cones are provided with similar grooves, $b$, these grooves being in the example shown of angular shape. Said arrangement of the cones G I causes the vehicle to travel in a straight course, under normal conditions; but, if desired, the wheel-cones may taper in opposite directions from each other, and the driving-cones be set correspondingly to cause the vehicle to travel in a circular course when the gear-wheel on one side operates in a larger groove than the gear-wheel on the other side. The gear-wheels J are fitted to the grooves $a\,b$, or to the ridges between them, and respectively enter into two opposite grooves when in use, so as to revolve by frictional contact with the cones; but it should be understood that the gear-wheels and cones may be toothed, if desirable, in the grooves, which latter may then be left flat. It will be seen that by providing the cones G I with grooves to receive the gear-wheels the latter are effectually prevented from shifting laterally when in action. The gear-wheels are supported by means of fixed shafts or axles c in arms d, which are secured to the opposite ends of a hand rod or traverse, K, connecting with two supporting-levers, L, which are pivoted to brackets M on the opposite sides of the frame B, as at e. The hand-rod K passes loosely through the levers L, so that it is movable in a longitudinal direction, besides swinging, together with the levers, on the fulcra of the latter, and if this rod is swung in the proper direction for throwing the gear-wheels J out of contact with the cones G I, such wheels may be shifted laterally by means of the rod to engage with different cone-grooves $a\ b$, so that the power applied to the road-wheels and the speed of the vehicle resulting therefrom may be varied to suit the grade and condition of the road without stopping the vehicle. Said hand-rod K enables the rider to throw the gear-wheels J in or out of contact with the cones G I, either both together or separately from each other, for the purpose of stopping or steering the vehicle, the effect of withdrawing one gear-wheel being to reduce the speed of or stop one of the road-wheels, which obviously alters the course of the vehicle. If desired, the hand-rod K may be made in two parts—one to each gear-wheel. When the driving-cones H are located above the cones G, the weight of the frame B and its load rests on the wheel-cones, whereby the required friction is maintained, the frame having been slightly raised from the pendants F by the introduction of the gear-wheels between the cones. When the front wheels, A, are used without the rear wheel, the load swings freely on the front wheels, it being below the center of gravity, and in action tends to climb the front of the wheels, which, to regain their equilibrium, continue to advance. The two sets of cones G I and gear-wheels J may also be applied to a single road-wheel, one set being arranged on each side of the wheel, with the driving-cones nearest the rider, to be operated from a seat by suitable cranks, and in that case the hand-rod is shortened, and forms, together with the arms, a forked frame, swinging on the hand-rod as a pivot, the other handle being provided on the arms. The inner or operative position of the gear-wheels J is determined by the levers M, when the latter are brought into a plane intersecting their fulcra and the axis of the wheels, as shown in Figs. 3 and 8, and the outer position of the wheels is determined by a stop, $f$, arranged on the bracket M, to regulate the movement of the levers.

To the free end of each wheel-supporting arm d is connected one end of a brake strap or bar, $d'$, (see Fig. 8,) the opposite end of which is connected to the proper pendant, F, and when the gear-wheels J are thrown out of contact with the cones these straps instantly take their places against the wheel-cones G and check the speed of the road-wheels, while when the gear-wheels are inserted between the cones the straps are relaxed and separated from the cones. Said straps $d'$ share the lateral movement of the gear-wheels J, together with the hand-rod K, and enter different grooves of the wheel-cones G, according to the positions of the parts. The cranks H′ of the crank-shafts are on the interior of the frame B, and are connected by rods $g$ to the opposite ends of a foot-bar, N, which is hung to a bracket, N′, on the lower part of the frame B by a central pivot, $h$, so that this bar is adapted to oscillate, and thus produce the required motion of the crank-shafts. Said foot-bar N has a series of two or more pedals, $i$, on opposite sides of its pivot $h$, and at equal distance therefrom, for receiving the feet of the rider, to support whom the frame B is provided with a seat, O; but, if desired, this seat may be omitted, in which case the rider will stand on the foot-bar and take hold of the hand-rod while operating.

By reason of the difference in the distances of the pedals $i$ of each series from the central pivot, $h$, the power required to produce the motion of the crank-shafts H from the foot-bar may be varied by simply changing the position of the feet from one coacting pair of pedals to another. If desired, the pedals $i$ may be made convex in cross-section to furnish a convenient foot-hold to the rider in any position of the foot-bar.

It will be noticed that by connecting the foot-bar N with both cranks H′ the proper alternative action of the cranks is insured.

To the crank-pin of each crank H′ is fixed at a distance from the latter a supplemental arm, H², which extends parallel to the cranks across the line of the crank-shaft and carries a handle, H³, at the outer or free end, so that by taking hold of these handles the power of the hands may be added to that of the feet for driving the vehicle. The said handles H² are diametrically opposite to the crank-pins in relation to the crank-shafts, and, due to this fact, said handles alternate with the crank-pins in their effect on said shafts, thus causing each hand to operate simultaneously with the foot opposite to it, as in walking. The foot-bar N may also be directly connected to cranks, or their equivalent, on the road-wheel axles A′, omitting the cones G I, in which case the road-wheels may be left loose on the axles and arranged to be connected to and disconnected therefrom by other suitable devices than the cones and gear, operated through the medium of the hand-rod for changing the relative speed of the wheels. The seat O is supported in the frame B by arms O′, (best seen in Fig. 3,) one at each end, which are pivoted to the sides of the frame, on the interior thereof, and rest on springs $l$, which in turn rest on lugs $l'$, projecting from the frame at the proper places, so that the seat is elastic or yielding. Said springs $l$ are duplicated; or, in other words, they are arranged on both vertical edges of the frame, and hence if the seat-supporting arms O' are detached the seat can be reversed in its position by reattaching the arms, so as to bring the seat on an opposite side of the frame, the rider in that event facing the wheel C, which thus becomes the front wheel. When the seat O is reversible, the hand-rod K and foot-bar N are made likewise, in order to be capable of preserving the required position relatively to the seat; and to this end the brackets M, supporting the hand-rod, are attached to the frame B by separable fastenings, allowing its removal from one part of the frame to another, while the bracket N, supporting the foot-bar, is split or divided and clamped to the required part of the frame by a bolt, $j$, thus making it adjustable. The frame connecting-rods E are four in number, two being at the top and two at the bottom of the vehicle—namely, above and below the wheel-axles—and such rods are pivoted at the ends to lugs $m$ on both frames B D, so that the frame D, together with the wheel C, may be turned on double axes, each similar in effect to the post of a bicycle, whereby the wheel, frame, and rider turn simultaneously, the clothes are not liable to be soiled by the wheel, and the ankles are not liable to be twisted by the cranks. Said frame D is provided on its upper part with a handle, $n$, while it carries a seat, P, by means of arms $o$, which are pivoted to the sides of the frame, and are sustained thereon by tension-springs $o'$, of india-rubber or other suitable material, so that this seat, like the seat O, is reversible. The handle $n$ passes through holes in the opposite sides of the frame, and is retained in its central or normal position on the frame by frictional contact only, in distinction from being fastened, so that the handle is movable longitudinally, and in case the vehicle is upset the handle, by its contact with the ground, drives partially through the frame and absorbs the blow. The wheel C is fixed to a shaft or axle, Q, (see Fig. 4,) which is provided with cranks R, one at each end, for imparting thereto and to the wheel a revolving motion, and which has its bearings in the sides of the frame D.

For the purpose of securing the wheel C on the axle Q, the axle is provided with a collar, $r$, on one side of the wheel, and with a screw-thread on the opposite side thereof, to which thread is fitted a nut, $r'$, so that when this nut is tightened the hub C' of the wheel is clamped between it and the collar, and is fixed to the shaft by that means. The shaft-holes in the frame D are made large enough for the passage of the collar $r$ and nut $r'$, and when these parts have been properly adjusted said holes are lined with bushes $q$ of soft metal, which thus receive the wear of and lubricate the axle, besides serving to fill up said holes.

Between both the collar $r$ and nut $r'$ and the sides of the frame D are interposed washers $s$, which are fastened to the frame at the ends, and each provided with a recess, $s'$, Fig. 6, to accommodate the axle. These washers $s$ serve to form a close joint between the collar and nut $r r'$ and the sides of the frame, and may be revolved, if necessary, whenever the nut is tightened, while they also serve to protect the bushes $q$ against the grinding action of said collar and nut. This construction of the wheel C and its arrangement in the frame allows all wear and tear of the parts to be taken up, so that the machine may be kept in order at all times, also allowing the parts to be quickly and easily separated for cleaning or other purposes. Each of the cranks R is entirely or partially split or divided longitudinally to form two jaws, R' R², between which is fitted a bent pin, $t$, carrying a pedal, $t'$, and which are provided with bolts $u$, for clamping the pin between the jaws, and also for clamping the cranks on the axle. Said pin $t$ thus is adjustable on the cranks, and allows the radius of the crank to be altered, besides being capable of turning up against the frame when not in use, while the cranks can be attached and detached with facility. In the example shown the cranks R are split throughout their entire length, and the parts thereof are united beyond the axle by a mortise and tenon, $k k'$, in addition to the bolts $u$, such devices being at the end of the crank, having the eye $w$ to embrace the wheel-axle.

It should be remarked that the cones G I and gear-wheels J, with their concomitants, can be used to vary the power and speed in other machines than wheeled vehicles, and I reserve the right to make such mechanism the subject-matter of a separate application for Letters Patent. Said cones, moreover, may be operated by other means than that herein described, and by any suitable power—as hand, foot, spring, steam, or electrical. In some cases the upper and lower connecting-rods, E, on each side of the vehicle may be connected together by diagonal braces for rigidity.

What I claim as new, and desire to secure by Letters Patent, is—

1. The combination, in a wheeled vehicle, of the pair of wheel-cones and the pair of driving-cones having circumferential grooves corresponding to each other, the pair of gear-wheels adapted to enter said grooves for connecting the wheel-cones with the driving-cones, a means for throwing the gear-wheels into and out of action, either independently from or in unison with each other, and a means, substantially such as herein described, for operating the driving-cones.

2. The combination, substantially as hereinbefore set forth, of the pair of wheel-cones and the pair of driving-cones having circumferential grooves corresponding to each other, the pair of gear-wheels adapted to enter said grooves for connecting the wheel-cones with the driving-cones, a support common to both gear-wheels for throwing them into and out of action, and a means, substantially such as herein described, for operating the driving-cones.

3. The combination, in a wheeled vehicle, of the pair of wheel-cones and the pair of driving-cones having circumferential grooves corresponding to each other, the pair of gear-wheels adapted to enter said grooves for connecting the wheel-cones with the driving-cones, a means for throwing the gear-wheels into and out of action independently from or in unison with each other and adjusting them to different grooves of the cones, and a means, substantially such as herein described, for operating the driving-cones.

4. The combination, in a wheeled vehicle, of the pair of wheel-cones and the pair of driving-cones having circumferential grooves corresponding to each other, the pair of gear-wheels adapted to enter said grooves for connecting the wheel-cones with the driving-cones, a support common to both gear-wheels for throwing them into and out of action and adjusting them to different grooves of the cones, and a means, substantially such as herein described, for operating the driving-cones.

5. The combination, substantially as hereinbefore described, of the pair of road-wheels having central cones, the pair of driving-cones, the pair of gear-wheels for connecting the wheel-cones with the driving-cones, and the longitudinally and laterally movable hand-rod supporting both gear-wheels.

6. The combination, substantially as hereinbefore described, of the pair of road-wheels having central cones, the pair of driving-cones, the pair of gear-wheels for connecting the wheel-cones with the driving-cones, the hand-rod supporting both gear-wheels, and the levers supporting the hand-rod.

7. The combination, substantially as hereinbefore described, of the pair of road-wheels, the operating-cranks, the foot-bar, the rods connecting the foot-bar to said cranks, and a means for throwing each crank into and out of gear with its road-wheel independently or the other.

8. In a wheeled vehicle, the combination, with a road-wheel, a driving medium having a fixed relation to the road-wheel, and with foot-gear for operating the driving medium, of a gear-wheel for connecting the road-wheel with the driving medium, and a support for the gear-wheel adapted to be adjusted for throwing said wheel into and out of action, whereby the power may be taken off from the road-wheel without affecting the driving medium or foot-gear.

9. In a wheeled vehicle, the combination, with a road-wheel and a driving medium having a fixed relation to the road-wheel, of a gear-wheel for connecting the road-wheel with the driving medium, a support for the gear-wheel adapted to be adjusted for throwing said wheel into and out of action, and a brake connected to said wheel-support to act on the road-wheel when the gear-wheel is thrown out of action.

10. The combination, substantially as hereinbefore described, of the pair of road-wheels having central cones, the driving-cones, the gear-wheels for connecting the wheel-cones with the driving-cones, the hand-rod supporting the gear-wheels, and the brake-straps connected to the hand-rod, to be applied thereby to the wheel-cones when the gear-wheels are thrown out of action.

11. In a wheeled vehicle, the combination, with a road-wheel, of a movable frame connected to the axle of said wheel, and a driving medium arranged in the frame to act on the road-wheel by the friction maintained between it and the wheel by the weight of the load.

12. In a wheeled vehicle, the combination of a road-wheel having a central cone or pulley, a movable frame connected to the axle of said wheel, a driving cone or pulley arranged in the frame above the wheel cone or pulley to maintain friction, and a gear-wheel connecting the wheel-cone with the driving-cone.

13. The combination, substantially as hereinbefore described, of the pair of road-wheels having central cones, the movable frame, the pendants connecting the frame to the axles of the wheels, the driving-cones arranged in the frame, and the gear-wheels connecting the wheel-cones with the driving-cones.

14. The combination, substantially as hereinbefore described, of the pendants having knuckles $v$, the frame having knuckles $v'$, the pivots passing through said knuckles, the pair of road-wheels having central cones, the driving-cones arranged in the frame, and the gear-wheels connecting the wheel-cones with the driving-cones.

15. The combination, substantially as hereinbefore described, with the pair of road-wheels, of the pendants having knuckles $v$, the frame having knuckles $v'$, and the pivots passing through said knuckles, and having different lengths on the respective edges of the frame.

16. The combination, substantially as hereinbefore described, with the pair of road-wheels and driving-gear, of the foot-bar oscillating on a central pivot and connecting with the driving-gear, and a series of pedals arranged on each side of said pivot, at equal distances therefrom, upon the foot-bar, whereby a positive hold is afforded to the feet of the rider at different portions of the bar.

17. The combination, substantially as hereinbefore described, with the pair of road-wheels and their driving-gear, of the crankshafts concomitant to the driving-gear, the cranks, each having its pin provided with a supplemental arm carrying a handle diametrically opposite to the crank-pin, the oscillating foot-bar, and the rods connecting said bar to the crank-pins, whereby an alternating action of the hands and feet is produced.

18. The combination, substantially as hereinbefore described, of the reversible seat O with the frame B, the pair of road-wheels, and the road-wheel driving-gear.

19. The combination, substantially as hereinbefore described, of the reversible seat O and the reversible hand-rod K with the frame B, the pair of road-wheels, and the road-wheel driving-gear.

20. The combination, substantially as hereinbefore described, of the reversible seat O and the reversible oscillating foot-bar N with the frame B, the pair of road-wheels, and the road-wheel driving-gear.

21. The combination, substantially as hereinbefore described, of the reversible seat O, the reversible hand-rod K, and the reversible oscillating foot-bar N with the frame B, the pair of road-wheels, and the road-wheel driving-gear.

22. The combination, substantially as hereinbefore described, of the frame B, the frame D and its seat, the pair of road-wheels, and the single road-wheel supporting said frames, respectively, and the connecting-rods united to the opposite sides of said frames above and below the wheel-axles by coincident pivots.

23. The combination, substantially as hereinbefore described, of the frame D, having the reversible seat P, and the single road-wheel supporting said frame, and having a cranked axle.

24. The combination, substantially as hereinbefore described, of the frame D, the single road-wheel, the wheel-axle having its bearings in the sides of said frame, and having the collar and screw-nut on opposite sides of the wheel-hub, and the washers interposed between said collar and nut and the sides of the frame.

25. The combination, substantially as hereinbefore described, of the frame B, the single road-wheel, the wheel-axle having its bearings in the sides of said frame, and having the collar and screw-nut on opposite sides of the wheel-hub, the bushes fitted to said bearings of the axle, and the washers interposed between said collar and nut and the sides of the frame.

26. The combination, substantially as hereinbefore described, of the frame D, the single road-wheel, the wheel-axle, the split cranks arranged thereon, and provided with pedals, and bolts for clamping the jaws of said cranks on the axle.

27. The combination, substantially as hereinbefore described, of the frame D, the single road-wheel, the wheel-axle, the split cranks arranged thereon, the bent pins fitted between the jaws of said cranks, and bolts for clamping said jaws of the cranks on the axle and on the crank-pins.

28. The combination, substantially as hereinbefore described, of the frame D, the single road-wheel, the wheel-axle, the split cranks arranged thereon, the bent pins fitted between the jaws of said cranks, bolts for clamping said jaws, and pedals mounted on the bent pins.

In testimony whereof I have hereunto set my hand and seal in the presence of two subscribing witnesses.

ARTHUR M. ALLEN. [L. S.]

Witnesses:
W. HAUFF,
CHAS. WAHLERS.